US006008824A

United States Patent [19]

Nitta

[11] Patent Number: 6,008,824

[45] Date of Patent: Dec. 28, 1999

[54] RECORDING APPARATUS INCLUDING FEEDING MECHANISM WITH EXHAUSTING ROLLER CONNECTED TO SHEET GUIDE MEMBER

[75] Inventor: Tetsuhiro Nitta, Yokohama, Japan

[73] Assignee: Canon Kabushiki Kaisha, Tokyo, Japan

[21] Appl. No.: 08/418,880

[22] Filed: Apr. 7, 1995

Related U.S. Application Data

[63] Continuation of application No. 07/963,732, Oct. 20, 1992, abandoned.

[30] Foreign Application Priority Data

Oct. 21, 1991 [JP] Japan .................................... 3-299614

[51] Int. Cl.$^{6}$ .................................................... G01D 15/24

[52] U.S. Cl. ............................................................ 346/134

[58] Field of Search ............................ 347/104; 346/134, 346/136; 271/171, 117; 400/629, 636.1, 633, 633.1; 399/45, 23, 393

[56] References Cited

U.S. PATENT DOCUMENTS

| | | | |
|---|---|---|---|
| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,558,858 | 12/1985 | Runzi . | |
| 4,567,492 | 1/1986 | Skafvenstedt et al. | 346/136 |
| 4,723,129 | 2/1988 | Endo et al. . | |
| 4,740,796 | 4/1988 | Endo et al. . | |
| 5,171,006 | 12/1992 | Naito | 271/9.09 |
| 5,235,353 | 8/1993 | Hirano et al. | 346/145 |

FOREIGN PATENT DOCUMENTS

| | | | |
|---|---|---|---|
| 0223523 | 5/1987 | European Pat. Off. . | |
| 0418793 | 3/1991 | European Pat. Off. . | |
| 54-056847 | 5/1979 | Japan . | |
| 57-091287 | 6/1982 | Japan . | |
| 58-152735 | 9/1983 | Japan | 271/117 |
| 59-123670 | 7/1984 | Japan . | |
| 59-138461 | 8/1984 | Japan . | |
| 60-071260 | 4/1985 | Japan . | |
| 03-227630 | 10/1991 | Japan . | |

*Primary Examiner*—N. Le
*Assistant Examiner*—Michael Nghiem
*Attorney, Agent, or Firm*—Fitzpatrick, Cella, Harper & Scinto

[57] ABSTRACT

A sheet feeding device and a recording apparatus using such a sheet feeding device include a feed mechanism for feeding a sheet material, a guide mechanism for guiding the end portions of the sheet material, which is shiftable in the width direction of the sheet material, and a discharge mechanism for discharging the sheet material being fed. The discharge mechanism is capable of changing its positions in accordance with the shift of the guide.

26 Claims, 3 Drawing Sheets

RECORDING APPARATUS INCLUDING FEEDING MECHANISM WITH EXHAUSTING ROLLER CONNECTED TO SHEET GUIDE MEMBER

This application is a continuation of application Ser. No. 07/963,732, filed Oct. 20, 1992, now abandoned.

BACKGROUND OF THE INVENTION

1. Field of the Invention

The present invention relates to a feeding mechanism for a sheet material and a recording apparatus using such a mechanism.

2. Related Background Art

A printer, a copying machine, a facsimile apparatus, and other recording apparatuses are of such a structure that its recording head is driven in accordance with recording information to record images on a recording sheet such as a paper or plastic sheet.

For the recording apparatus mentioned above, the recording sheet is being fed automatically by a sheet feeding device besides its manual set for insertion. In general, the sheet feeding device is provided with a feed driving unit for feeding a recording sheet by rotating the feed roller, and an discharge tray unit for stacking the recorded sheets which have been discharged. The arrangement is made for this device so that by utilizing the driving force for the carrier system of the recording apparatus, the foregoing feed driving unit is driven to feed the foregoing recording sheets one by one separately.

However, since the sheet feeding device carries the recording sheet to be discharged while depressing the recording surface of the recording sheet with an discharge roller or a spur directly, there may be some cases where the traces of the roller or other marks remain on the recorded portion. Also, in a case of an ink jet recording apparatus or the like where ink liquid is ejected for recording, the roller depresses the inked surface to cause the occurrence of smudges.

SUMMARY OF THE INVENTION

It is an object of the present invention to solve the foregoing problems of the conventional art and provide a sheet feeding device capable of preventing the smudges caused by a roller, a spur, or the like when a recorded sheet is discharged, and a recording apparatus using such a sheet feeding device.

It is another object of the present invention to provide a sheet feeding device in which discharging means is arranged to depress the vicinity of the end portions of a sheet in its width direction at all times, and the discharging means is capable of carrying the recording sheet by gripping the portions other than the recording area thereof when this device is used for a recording apparatus.

It is still another object of the present invention to provide a sheet feeding device including a feeding mechanism for feeding a sheet material; a guiding mechanism movable in the width direction of the foregoing sheet material to guide the end portions of the sheet material; and an discharging mechanism capable of changing its position in accordance with the shifting of the foregoing guiding mechanism to discharge the foregoing sheet material which has been fed.

DETAILED DESCRIPTION OF THE PREFERRED EMBODIMENTS

Figure 1:
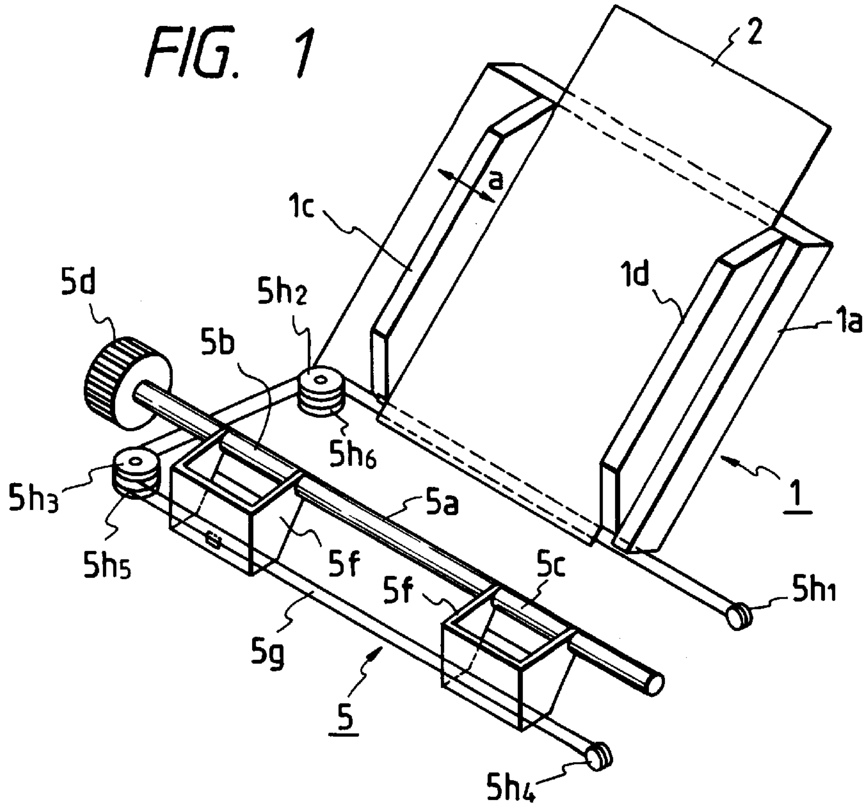
FIG. 1 is a perspective view illustrating a sheet feeding device according to an embodiment of the present invention.
Figure 2:
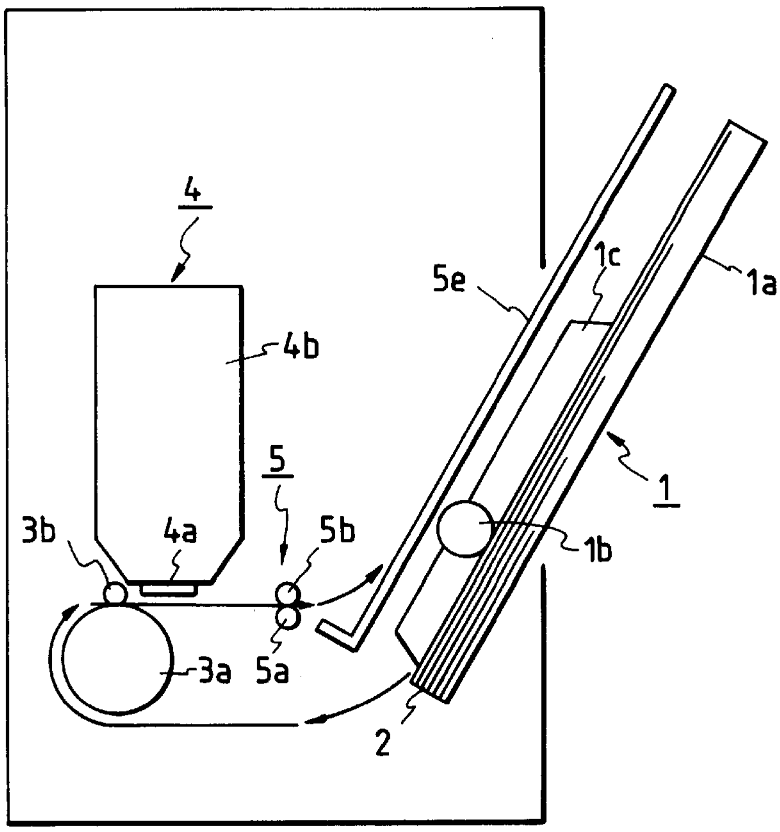
FIG. 2 is a view schematically illustrating a recording apparatus using the sheet feeding device.
Figure 3:
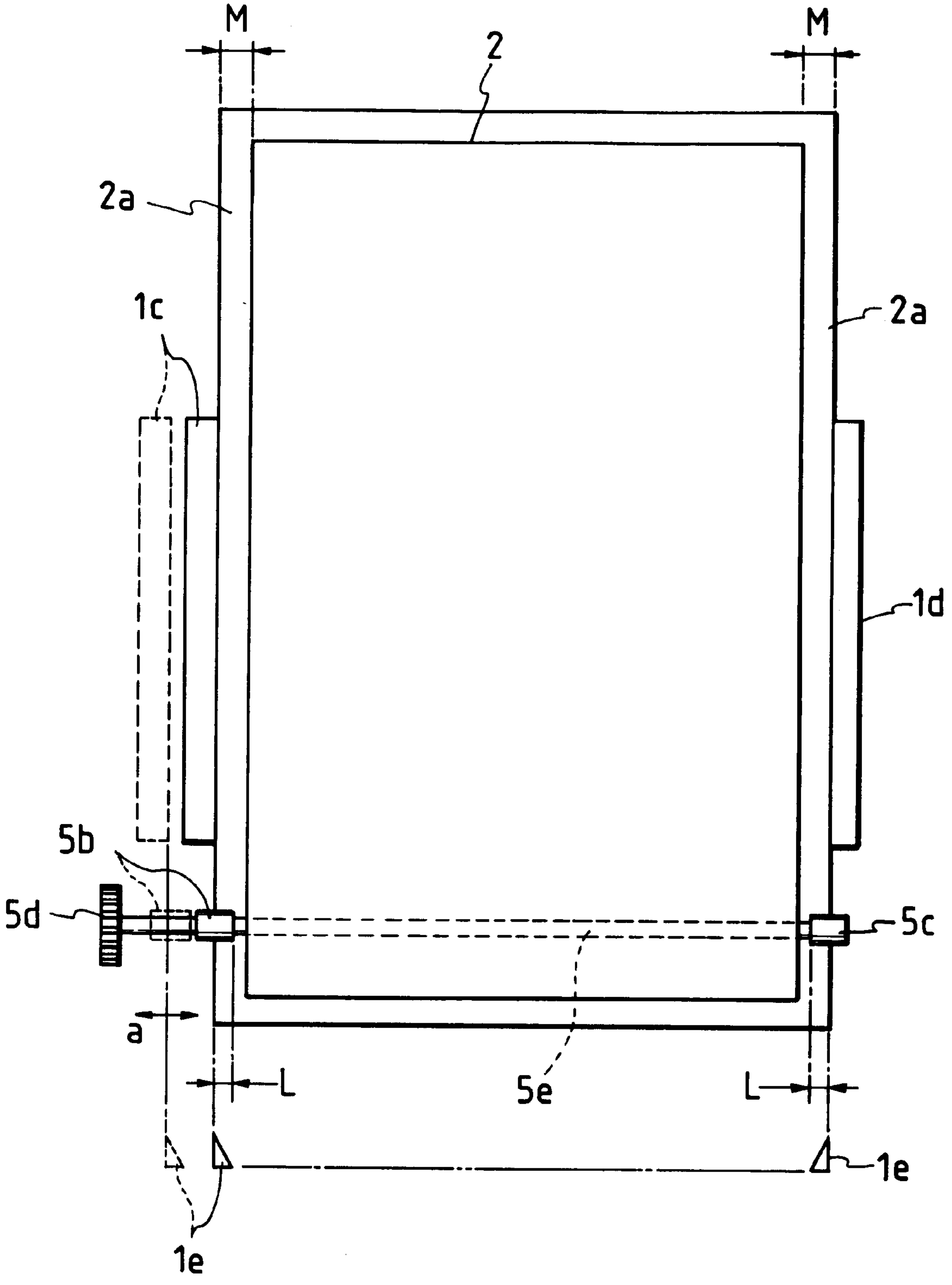
FIG. 3 is a view for explaining the positional relations between a recording sheet and a discharge roller.

Hereinafter, with reference to FIG. 1 to FIG. 3, the description will be made of an embodiment of the present invention applicable to an ink jet recording apparatus. In this respect, FIG. 1 is a perspective view illustrating a sheet feeding device. FIG. 2 is a view schematically illustrating the structure of an ink jet recording apparatus using the foregoing sheet feeding device. FIG. 3 is a view for explaining the positional relations between a recording sheet and a discharge roller.

This apparatus is of such a structure that a recording sheet 2 is fed by feeding means 1 in the direction indicated by an arrow shown in FIG. 2, at the same time being carried with a pair of feeding rollers 3*a* and 3*b* for a given recording performed by recording means 4, and then the recording sheet 2 is discharged by discharging means 5.

The structure of the foregoing feeding means 1 is that when recording sheets 2 are stacked on a feed tray 1*a* which may serve as a recording sheet mounting means, a recording sheet 2 placed on top thereof is depressed by a feeding roller 1*b*, which may serve as a recording sheet feeding means, by means of a spring (not shown). Also, on the feed tray 1*a*, guide members 1*c* and 1*d* are arranged as shown in FIG. 1 to guide both ends of the recording sheet 2 in its width direction. One of the guide members 1*c* is arranged slidably in the width direction of the recording sheet 2 (direction indicated by an arrow a in FIG. 1). Further, at the lower ends of the guide members 1*c* and 1*d*, separation nails 1*e* are mounted, respectively. Guide members 1*c* and 1*d* may serve as recording sheet guide members.

Therefore, when the recording sheets 2 are set on the feed tray 1*a* and the feeding roller 1*b* is rotatively driven by means of a motor (not shown), a recording sheet 2 on the uppermost layer is separated by the separation nails 1*e* for feeding.

The foregoing recording sheet 2 thus fed is being guided to a paper pan (not shown). Then, it is carried to be U-turned in the direction indicated by arrows in FIG. 2 to arrive at the recording position of the recording means 4.

The recording means 4 is to record ink images on the recording sheet 2 which has been conveyed. The recording means for this device is structured integrally with a line-type recording head 4*a* and an ink tank 4*b* and is arranged to use an ink jet recording method such as ejecting ink from the foregoing recording head 4*a* for recording. In other words, this recording head 4*a* is provided with minute liquid discharging ports (orifices), liquid passages, energy activating portions arranged on part of the liquid passages, and energy generating means to generate energy for the formation of liquid droplets to affect liquid in the foregoing activating portions.

For energy generating means for generating such energy as this, there are among others a recording method using electromechanical transducer such as piezoelectric elements, a recording method using energy generating means wherein heat generation is effectuated by irradiation of laser or other electromagnetic waves so as to eject liquid droplets by the application of the foregoing exothermic activation, or a recording method using energy generating means wherein liquid is heated by means of electrothermal transducers such as exothermic elements having exothermic resistive members so as to cause the liquid to be ejected.

Of these methods, the recording head used for the ink jet recording method wherein liquid is ejected by the utilization of thermal energy is capable of allowing its liquid discharging ports (orifices) for ejecting recording liquid droplets for the formation of discharging droplets to be arranged in a high density. Particularly, among such recording heads, the recording head using electrothermal transducers as energy generating means can be built compactly with ease, and for such a recording head, it is possible to utilize sufficiently the advantages of the IC technologies and micro-machining techniques which have demonstrated significant improvement in the advancement and reliability of the technologies in the semiconductor field of recent years; hence advantageously enabling a highly precise assembly for such a head with ease at a lower manufacturing cost.

This recording means 4 selectively ejects ink images onto a recording sheet 2 for recording by energizing the foregoing electrothermal transducers in accordance with image signals in synchronism with the conveyance of the foregoing recording sheet 2.

The recording sheet 2 on which given recording has been made by the foregoing recording means 4 is discharged by discharging means 5. This discharging means 5 is structured, as shown in FIG. 1 and FIG. 2, with a discharge driving roller 5*a,* and two discharging free rollers 5*b* and 5*c* to be in contact with the foregoing driving roller 5*a* under pressure by means of spring and others (not shown). Then, by driving a motor (not shown) which is connected to a transmission gear 5*d* mounted at the shaft end of the foregoing driving roller 5*a,* the driving roller 5*a* and free rollers 5*b* and 5*c* are caused to grip the recorded recording sheet 2 to be discharged onto the discharge tray 5*e.*

The rotation peripheral velocity of the discharge driving roller 5*a* is set slightly larger than that of the feed driving roller 3*a.* Also, the feeding speed of the recording sheet 2 is arranged to follow the rotational speed of the feed driving roller 3*a* by the transmission of driving force to the foregoing transmission gear 5*d* through a sliding clutch.

Further, the structure is arranged so that one of the foregoing discharging free rollers 5*b* is mounted slidably in the width direction of a recording sheet and when the foregoing guide member 1*c* slides, the discharging free roller 5*b*, which may serve as an exhausting roller, also slides accordingly.

In other words, to a roller supporting member 5*f* which supports the discharging free roller 5*b* rotatively, a wire (belt or the like) 5*g* is connected. While this wire 5*g* is tensioned between pulleys 5*h*1, 5*h*2, 5*h*3, 5*h*4, 5*h*5, and 5*h*6, it is connected to the guide member 1*c*. Therefore, if the guide member 1*c* is caused to slide to match the width of a recording sheet 2, the discharging free roller 5*b* is also allowed to slide in the same direction for the same amount.

Here, the description will be made of the gripping position for a recording sheet 2 by means of the foregoing driving roller 5*a* and free rollers 5*b* and 5*c*. As shown in FIG. 3, given the projecting amount of the discharging free rollers 5*b* and 5*c* from the guiding surface of the guide members 1*c* and 1*d* as L while the length of the marginal spaces 2*a* at the left and right end sides outside the recording area (slashed portion in FIG. 3) of the recording sheet 2 as M, they are defined to be L<M.

Therefore, the left and right end sides of the recording sheet 2 in conveyance are guided by the guide members 1*c* and 1*d* so as to be fed without any slanting. Then, after a given recording is performed by recording means 4, the discharging free rollers 5*b* and 5*c* which are in contact with the recording surface serve to discharge the recording sheet 2 by gripping the marginal portions 2*a* at all times.

As a result, irrespective of the sizes of a recording sheet 2, rollers and others are not in contact with the recording area where ink has not been fixed as yet; thus making it possible to obtain recorded images in high quality by preventing any creation of smudges due to re-transfer of ink and others.

In the foregoing embodiment, an example is shown in which the guide member 1*c* and the discharging free roller 5*b* are connected by the wire 5*g* in order to interlock the slide of the roller with the movement of the guide member.

Figure 4:
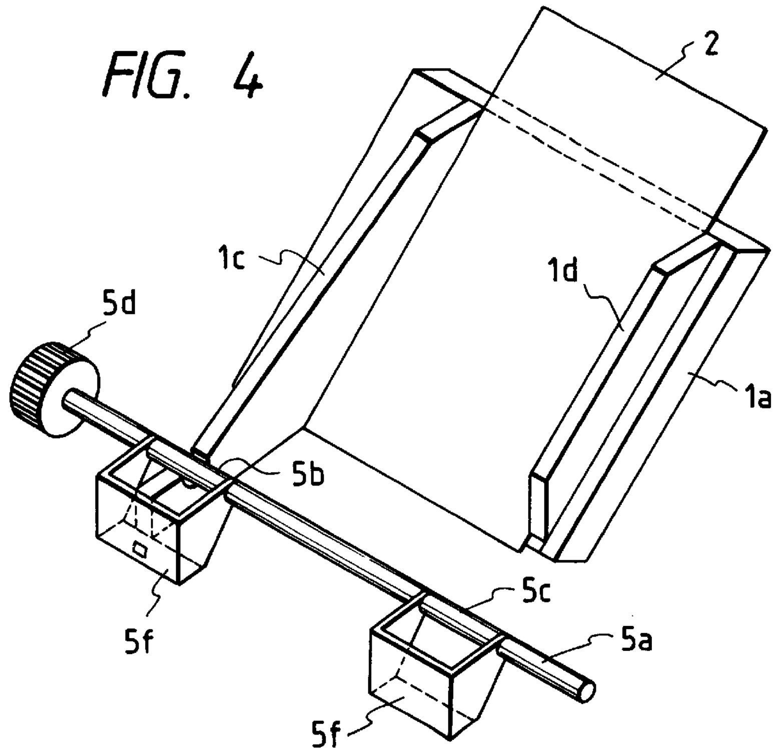
FIG. 4 is a view illustrating an embodiment wherein a guide member and a roller holding member are integrally structured.

Hereinafter, another embodiment according to the present invention will be described. A structure shown in FIG. 4 is such that a slidable guide member 1*c* and a discharging free roller 5*b* are integrally connected to a roller supporting member 5*f* so that the guide member 1*c* and the discharging free roller 5*b* are allowed to slide integrally.

In this way, it becomes possible to avoid using the wire and pulleys as in the case of the foregoing embodiment and reduce the number of parts for the device. As a result, the assembling processes can be simplified and the manufacturing cost can be reduced as well.

Also, in the foregoing embodiment described in conjunction with FIGS. 1 to 3, the exhausting rollers 5*b* and 5*c* are arranged in contact with the recording side of a recording sheet 2, but it may be possible to arrange the structure so that driving force is transmitted to the foregoing rollers 5*b* and 5*c* while making the roller 5*a* to be freely rotatable.

Figure 5:
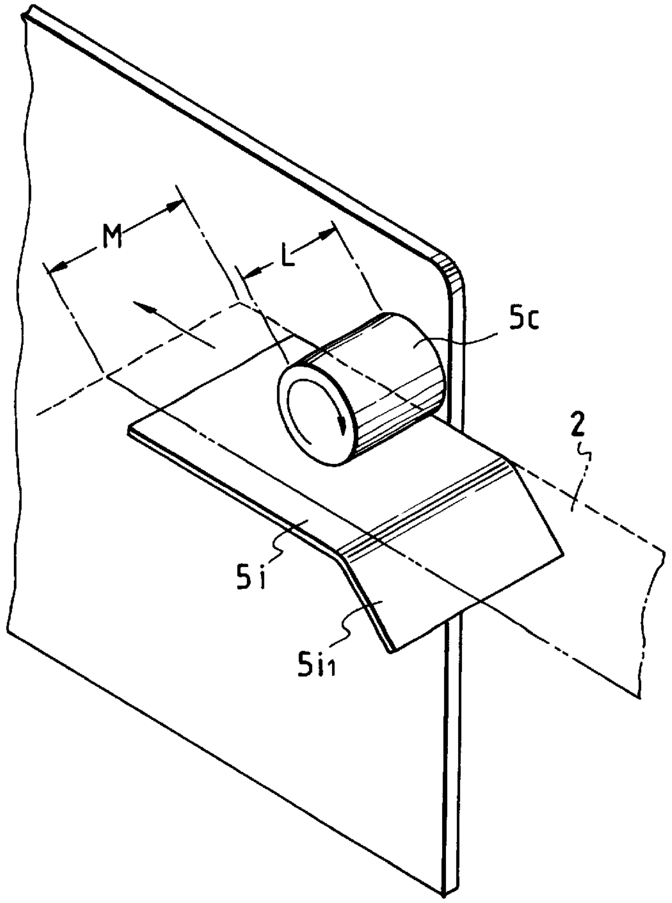
FIG. 5 is a view illustrating an embodiment wherein a recording sheet is discharged by means of a discharging free roller and a plate which are in contact under pressure.

Further, when the driving force is transmitted to the rollers 5*b* and 5*c* as described above, it may be possible to arrange the structure so that in place of the roller 5*a,* a plate 5*i* as shown in FIG. 5 is in contact with the rollers 5*b* and 5*c* under pressure. In this case, it is possible to discharge a recording sheet 2 smoothly by using a material having a small friction coefficient $\mu$, such as POM, for the surface of the plate 5*i.* Then, at one side end of the plate 5*i* (on the upstream side of the sheet conveying direction), a slope 5*i*1 is formed to provide a wide frontage for the sheet 2 to grip the recording sheet 2 smoothly.

Further, in the foregoing embodiment described in conjunction with FIG. 1 to FIG. 3, an example is shown in which one of the guide members 1*c* is structured to be slidable while the other one of the guide members 1*d* is fixed. However, it may be possible to structure both of guide members 1*c* and 1*d* slidably. Then, the structure is arranged so that each of the discharging free rollers 5*b* and 5*c* slides in accordance with the sliding of the guide members 1*c* and 1*d,* respectively.

Furthermore, if a recording sheet 2 used for the recording apparatus is only one kind, the guide members 1*c* and 1*d* and the discharging free rollers 5*b* and 5*c* are not necessarily structured to be slidable.

Also, in the foregoing embodiment described in conjunction with FIG. 1 and FIG. 3, an ink jet recording method is employed as its recording means. It is more preferable to structure the recording means in such a manner that the electrothermal transducers are energized in accordance with recording signals and then with the thermal energy which becomes applicable by means of the foregoing electrothermal transducers, film boiling occurring in ink is utilized for the development of bubbles in ink and contraction thereof to cause ink droplets to be ejected from the discharging ports for recording.

Regarding the typical structure and operational principle of such a method, it is preferable to adopt those which can be implemented using the fundamental principle disclosed in the specifications of U.S. Pat. Nos. 4,723,129 and 4,740,796. This method is applicable to a so-called on-demand type recording system and a continuous type recording system. Particularly, however, it is suitable for the on-demand type because the principle is such that at least one driving signal, which provides a rapid temperature rise beyond a departure from nucleation boiling point in response to recording information, is applied to an electrothermal transducer disposed on a liquid (ink) reining sheet or liquid passage whereby to cause the electrothermal transducer to generate thermal energy to produce film boiling on the thermoactive portion of the recording head; thus effectively leading to the resultant formation of a bubble in the recording liquid one to one for each of the driving signals. By the development and contraction of the bubble, the liquid is ejected through a discharging port to produce at least one droplet. The driving signal is preferably in the form of a pulse because the development and contraction of the bubble can be exerted instantaneously, and therefore, the liquid is ejected with quick response.

The driving signal in the form of the pulse is preferably such as disclosed in the specifications of U.S. Pat. Nos. 4,463,359 and 4,345,262.

In addition, the temperature increasing rate of the thermoactive surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid passages, and the electrothermal transducers as disclosed in the above-mentioned patents (linear type liquid passage or right angle liquid passage). Besides, the structure such as disclosed in the specifications of U.S. Pat. Nos. 4,558,333 and 4,459,600 wherein the thermal activation portions are arranged in a curbed area is also included in the present invention.

In addition, the present invention is applicable to the structure disclosed in Japanese Patent Application Laid-Open No. 59-123670 wherein a common slit is used as the discharging port for plural electrothermal transducers, and to the structure disclosed in Japanese Patent Application Laid-Open No. 59-138461 wherein an opening for absorbing pressure wave of the thermal energy is formed corresponding to the ejecting portion. In other words, according to the present invention, it becomes possible to operate the assuredly irrespective of the modes of the recording head.

Further, as a recording method, it may be possible to employ the method wherein a recording head is mounted on a carriage and then ink is ejected for recording while the carriage is allowed to travel in the width direction of the recording sheet, that is, the so-called serial type recording structure besides the use of the foregoing full-line type recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

Also, it is preferable to add the recording head recovery means and preliminarily auxiliary means which are provided as constituents of a recording apparatus according to the present invention. They will contribute to making the effects of the present invention more stable. To name them specifically, they are capping means for the recording head, cleaning means, compression or suction means, preliminary heating means such as electrothermal transducers or heating elements other than such transducing type or the combination of those types of elements, and the preliminary ejection mode besides the regular ejection for recording.

As regards the kind and number of the recording heads mountable on the carriage, it may be a single head corresponding to a single color ink, or may be plural heads corresponding to a plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Now, in the embodiments according to the present invention set forth above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stabilized ejection in general, the ink may be such that it can be liquefied when the applicable recording signals are given.

In addition, while preventing the temperature rise due to the thermal energy by the positive use of such energy as an energy consumed for changing states of the ink from solid to liquid, or using the ink which will be solidified when left intact for the purpose of preventing ink evaporation, it may be possible to apply to the present invention the use of an ink having a nature of being liquefied only by the application of thermal energy such as an ink capable of being ejected as ink liquid by enabling itself to be liquefied anyway when the thermal energy is given in accordance with recording signals, an ink which will have already begun solidifying itself by the time it reaches a recording medium.

For an ink such as this, it may be possible to retain the ink as a liquid or solid material in through holes or recesses formed in a porous sheet as disclosed in Japanese Patent Application Laid-Open No. 54-56847 or Japanese Patent Application Laid-Open No. 60-71260 in order to exercise a mode whereby to enable the ink to face the electrothermal transducers in such a state.

For the present invention, the most effective method for each of the above-mentioned ink materials is the one which can implement the film boiling method described as above.

Furthermore, as modes of the foregoing ink jet recording apparatus, a copying apparatus combined with a reader and the like or a facsimile apparatus having transmission and reception functions or the like may be employed in addition to those used as an image output terminal of an information processing apparatus such as a computer.

In this respect, while the description has been made of an ink jet recording method as the foregoing recording means, the present invention is not confined to the ink jet recording method, but it is applicable to the thermal transfer recording method or thermal sensitive recording method or further to recording methods other than an impact recording method such as a wire-dot recording method. Also the present invention is not necessarily limited to a serial recording method but it can be used for the so-called line recording method.

As described earlier, according to the present invention, discharging means is structured to be in contact with the portions of a recording sheet other than its recording area. Therefore, the given images recorded by recording means are not smudged when passing through the foregoing discharging means. Hence, it is possible to obtain recorded images in high quality.

Also, according to the present invention, it is possible to obtain recorded images in high quality irrespective of sheet sizes with the interlocked shifting of the foregoing discharging means with that of the guide members to guide the end portions of the recording sheet.

What is claimed is:

1. An ink jet recording apparatus for recording on a recording sheet by using in ink jet recording head, said recording sheet having a leading end and a trailing end and two side edges, said apparatus comprising:

recording sheet mounting means for mounting said recording sheet;

recording sheet feeding means for feeding said recording sheet by the leading end and in a conveying direction to a recording position where said recording sheet is recorded on by said ink jet recording head, said recording sheet having a widthwise direction perpendicular to the conveying direction;

a recording sheet conveyance route for guiding said recording sheet from said recording sheet feeding means to the recording position and exhausting said recording sheet from the recording position;

a plurality of exhausting rollers provided downstream of said recording sheet conveyance route with respect to the recording position to feed and exhaust said recording sheet from said recording position, said plurality of exhausting rollers comprising a driven exhausting roller and a free exhausting roller;

a recording sheet guide member provided on said recording sheet mounting means, said recording sheet guide member being movable in the widthwise direction to be in contact with the side edges of said recording sheet and limiting movement of said recording sheet in the widthwise direction; and exhausting roller moving means for moving said free exhausting roller in the widthwise direction of said recording sheet with respect to an exhausting direction of said recording sheet in accordance with movement of said guide member, said exhausting roller moving means moving a contacting position of said free exhausting roller to said recording sheet in accordance with the contact of said guide member to the side edges of said recording sheet.

2. An apparatus according to claim 1, wherein said exhausting roller moving means connects by a wire through a plurality of pulleys said recording sheet guide member and said free exhausting roller.

3. An apparatus according to claim 1, wherein said exhausting roller moving means. integrally connects said recording sheet guide member and said free exhausting roller.

4. An apparatus according to claim 1, wherein said ink-jet recording head comprises an electrothermal converting element, an ink discharge port, and means for discharging ink from said ink discharge port by using thermal energy generated by said electrothermal converting element.

5. A recording apparatus according to claim 1, wherein said ink jet recording head comprises an ink discharge port and means for discharging ink through said ink discharge port.

6. An ink-jet recording apparatus recording on a recording sheet by using an ink-jet recording head, said recording sheet having a leading end and a trailing end and two side edges, said apparatus comprising:

recording sheet mounting means for mounting said recording sheet;

recording sheet feeding means for feeding said recording sheet by the leading edge and in a conveying direction to an ink-jet recording position where said recording sheet is recorded on by said ink-jet recording head, said recording sheet having a widthwise direction perpendicular to the conveying direction;

a U-shaped recording sheet conveyance route from said recording sheet mounting means through said ink-jet recording position to a vicinity of said recording sheet mounting means;

a plurality of exhausting rollers provided in the vicinity of said recording sheet mounting means and on an exhausting side of said U-shaped recording sheet conveyance route to feed and exhaust said recording sheet from said ink-jet recording position, said plurality of exhausting rollers exhausting said recording sheet from said ink jet recording position by contacting and feeding said recording sheet, and said plurality of rollers comprising a driven exhausting roller and a free exhausting roller;

a recording sheet guide member provided on said recording sheet mounting means, said recording sheet guide member being movable in the widthwise direction to be in contact with the side edges of said recording sheet and limiting movement of said recording sheet in the widthwise direction; and exhausting roller moving means for moving said free exhausting roller in the widthwise direction of said recording sheet with respect to an exhausting direction of said recording sheet in accordance with the movement of said guide member, said exhausting roller moving member moving a contacting position of said free exhausting roller to a vicinity of an end outside a recording area on a recording surface of said recording sheet in accordance with the contact of said guide member to said side ends of said recording sheet.

7. An apparatus according to claim 6, wherein said exhausting roller moving means connects by a wire through a plurality of pulleys said recording sheet guide member and said free exhausting roller.

8. An apparatus according to claim 6, wherein said exhausting roller moving means integrally connects said recording sheet guide member and said free exhausting roller.

9. An apparatus according to claim 6, wherein said ink-jet recording head comprises an electrothermal converting element, an ink discharge port, and means for discharging ink from said ink discharge port by using thermal energy generated by said electrothermal converting element.

10. An ink jet recording apparatus for recording on a recording sheet by using an ink jet recording head, said recording sheet having a leading end and trailing end and two side edges, said apparatus comprising:

recording sheet mounting means for mounting said recording sheet;

recording sheet feeding means for feeding said recording sheet by the leading end and in a conveying direction to a recording position where said recording sheet is recorded by said ink jet recording head, said recording sheet having a widthwise direction perpendicular to the conveying direction;

a U-shaped recording sheet conveyance route from said recording sheet mounting means through said recording position to a vicinity of said recording sheet mounting means;

a plurality of exhausting rollers provided in the vicinity of said recording sheet mounting means and on an exhausting side of said U-shaped recording sheet conveyance route to exhaust said recording sheet from said recording position, said plurality of exhausting rollers exhausting said recording sheet from said recording position by contacting and conveying said recording sheet, and said plurality of exhausting rollers comprising a driven exhausting roller and a free exhausting roller;

a recording sheet guide member provided on said recording sheet mounting means, said recording sheet guide member being movable to be in contact with side edges of said recording sheet in the widthwise direction and limiting the movement of said recording sheet in the widthwise direction; and exhausting roller moving means for moving said free exhausting roller in a widthwise direction of said recording sheet with respect to an exhausting direction of said recording sheet in accordance with movement of said guide member, said exhausting roller moving means moving a contacting position of said free exhausting roller to said recording sheet in accordance with contact of said guide member to the side edges of said recording sheet.

11. An ink jet recording apparatus having an ink jet recording section for recording on a sheet by an ink jet recording head, said apparatus comprising:

a sheet supply section having a mounting surface for supporting a sheet to be conveyed to said ink jet recording section;

a sheet guide member provided contactably with a side of said sheet on said mounting surface and disposed along a feed direction, said guiding member being capable of adjustment in a direction laterally of said feed direction;

a feed mechanism for feeding said sheet from said mounting surface to said ink jet recording section;

a discharge mechanism for discharging said sheet from said ink jet recording section, said discharge mechanism comprising a driven sheet drive member and a free exhausting roller; and connecting means for connecting said sheet guide member and said free exhausting roller to move said free exhausting roller laterally of said sheet feeding direction to a drive position in accordance with lateral movement of said sheet guide member to adjust the position of the sheet in the widthwise direction.

12. An ink jet recording apparatus according to claim 11, wherein the drive position is a position other than the recording area of said sheet.

13. An apparatus according to claim 12, wherein said connecting means connects by a wire through a plurality of pulleys said sheet guide member and said free exhausting roller.

14. An apparatus according to claim 12, wherein said connecting means integrally connects said sheet guide member and said free exhausting roller.

15. An apparatus according to claim 12, wherein said ink-jet recording head comprises an ink discharge port and means for discharging ink through said ink discharge port.

16. An apparatus according to claim 12, wherein said ink-jet recording head comprises an electrothermal converting element, an ink discharge port, and means for discharging ink from said ink discharge port by using thermal energy generated by said electrothermal converting element.

17. An ink jet recording apparatus according to claim 11, wherein said connecting means comprises means for connecting said sheet guide member and said free exhausting roller to move said free exhausting roller in the same direction and by the same moving amount as said sheet guide member.

18. An apparatus according to claim 17, wherein said connecting means connects by a wire through a plurality of pulleys said sheet guide member and said free exhausting roller.

19. An apparatus according to claim 17, wherein said connecting means integrally connects said sheet guide member and said free exhausting roller.

20. An apparatus according to claim 17, wherein said ink-jet recording head comprises an ink discharge port and means for discharging ink through said ink discharge port.

21. An apparatus according to claim 17, wherein said ink-jet recording head comprises an electrothermal converting element, an ink discharge port, and means for discharging ink from said ink discharge port by using thermal energy generated by said electrothermal converting element.

22. An apparatus according to claim 11, wherein said connecting means connects by a wire through a plurality of pulleys said sheet guide member and said free exhausting roller.

23. An apparatus according to claim 11, wherein said connecting means integrally connects said sheet guide member and said free exhausting roller.

24. An apparatus according to claim 11, wherein said ink-jet recording head comprises an ink discharge port and means for discharging ink through said ink discharge port.

25. An apparatus according to claim 11, wherein said ink-jet recording head comprises an electrothermal converting element, an ink discharge port, and means for discharging ink from said ink discharge port by using thermal energy generated by said electrothermal converting element.

26. An ink jet recording apparatus having an ink jet recording area where recording is performed on a sheet using an ink jet recording head, said apparatus comprising:

sheet feeding means having a mounting surface for mounting the sheet fed to said ink jet recording area to perform ink jet recording;

a sheet guiding member slidable in a sheet width direction on said mounting surface so as to contact one side end of the sheet in the sheet width direction perpendicular to the feeding direction of the sheet mounted on said mounting surface;

a separation claw for provided downstream of a conveyance direction of the sheet of said sheet guiding member to separate the sheet at an uppermost position among the sheets mounted on said mounting surface;

an expelling roller provided correspondingly to said sheet guiding member along a width direction to expel the sheet from said ink jet recording area;

an expelling roller supporting member for supporting said expelling roller movably in a direction of a rotation axis of said expelling roller; and moving means for moving said separation claw and said expelling roller by the same amount of a sliding amount of said sheet guiding member in association with the sliding movement in said sheet width direction of said sheet guiding member.

* * * * *

UNITED STATES PATENT AND TRADEMARK OFFICE

CERTIFICATE OF CORRECTION

PATENT NO. : 6,008,824

DATED : December 28, 1999

INVENTOR(S): TETSUHIRO NITTA

It is certified that error appears in the above-identified patent and that said Letters Patent is hereby corrected as shown below:

COLUMN 1,
Line 24, "an" should read --a--;
Line 33, "an" should read --a--; and
Line 60, "an" should read --a--.
COLUMN 3,
Line 1, "transducer" should read --transducers--.
COLUMN 5,
Line 54, "wave" should read --waves--.
COLUMN 7,
Line 23, "in" should read --an--; and
Line 65, "means." should read --means--.
COLUMN 10,
Line 60, "delete "for", and change "of" to --in--.

Signed and Sealed this

Sixteenth Day of January, 2001

*Attest:*

Q. TODD DICKINSON

*Attesting Officer*

*Commissioner of Patents and Trademarks*